(12) United States Patent
Hazenbroek et al.

(10) Patent No.: US 6,764,393 B1
(45) Date of Patent: Jul. 20, 2004

(54) SELF REALIGNING ROTARY SHACKLE

(75) Inventors: Jacobus E. Hazenbroek, Klaaswaal (NL); Jaco Gardenier, Numansdorp (NL)

(73) Assignee: Systemate Group, B.V., Numansdorp (NL)

( * ) Notice: Subject to any disclaimer, the term of this patent is extended or adjusted under 35 U.S.C. 154(b) by 0 days.

(21) Appl. No.: 10/364,201

(22) Filed: Feb. 11, 2003

(51) Int. Cl.[7] .............................................. A22C 21/00
(52) U.S. Cl. ...................................................... 452/188
(58) Field of Search ................................ 452/179, 183, 452/184, 187, 188

(56) References Cited

U.S. PATENT DOCUMENTS

| | | | |
|---|---|---|---|
| 3,518,717 A | | 7/1970 | Johnson et al. ................. 17/11 |
| 3,684,078 A | * | 8/1972 | Nielsen ................. 198/377.01 |
| 5,092,815 A | * | 3/1992 | Polkinghorne .............. 452/179 |
| 5,366,406 A | | 11/1994 | Hobbel et al. ............... 452/179 |
| 5,487,700 A | | 1/1996 | Dillard ........................ 452/188 |
| 5,505,657 A | * | 4/1996 | Janssen et al. ............... 452/179 |
| 6,010,398 A | * | 1/2000 | Mente ......................... 452/188 |
| 6,017,269 A | * | 1/2000 | Altenpohl, III ............. 452/188 |
| 6,179,701 B1 | * | 1/2001 | Tieleman ..................... 452/179 |
| 6,179,702 B1 | | 1/2001 | Hazenbroek ................. 452/188 |
| 6,277,021 B1 | * | 8/2001 | Meyn ......................... 452/188 |
| 6,478,668 B2 | * | 11/2002 | Visser et al. ................. 452/179 |
| 2002/0090905 A1 | * | 7/2002 | Moriarity .................... 452/188 |

FOREIGN PATENT DOCUMENTS

| | | |
|---|---|---|
| EP | 0 916 265 A2 | 1/1993 |
| EP | 0 786 208 A1 | 1/1997 |

* cited by examiner

*Primary Examiner*—Peter M. Poon
*Assistant Examiner*—David Parsley
(74) *Attorney, Agent, or Firm*—Thomas, Kayden, Horstemeyer & Risley

(57) ABSTRACT

A shackle assembly (10) transports poultry carcasses along a poultry processing line. Turning block (50) turns the stirrups (18) of the shackle in response to engagement with turning pins (75) that are located along the processing path, so as to properly orient the bird carried by the shackle to the next cutting station. One of the side wings (66) of the turning block (50) is relieved such that its turning slots will not engage the turning pin, thereby avoiding the turning of the stirrups. This assures that the stirrups, and therefore the bird carried by the stirrups, are properly oriented for the next cutting station.

8 Claims, 3 Drawing Sheets

SELF REALIGNING ROTARY SHACKLE

FIELD OF THE INVENTION

This invention concerns shackles of the type that transport poultry carcasses in sequence along a processing path, particularly through the cut-up line where the poultry carcasses are cut apart. More particularly, the invention concerns the method and apparatus for realigning the stirrups of the poultry shackle as the birds begin movement along a processing path.

BACKGROUND OF THE INVENTION

In the automated processing of poultry, it is common practice to suspend previously eviscerated, oven-ready poultry carcasses by their legs from shackles that are moved along a suspended conveyor system through a processing plant. The shackles have stirrups that support the legs of the birds, and the shackles can be turned about their upright axes as they advance along the processing path so as to present the birds at different orientations for weighing the bird or for the cutting process. For example, the birds may be turned sideways for advancement through a cutting station where the breast of the bird is to be cut, or turned so that the breast of the bird faces forwardly as the wings or other appendages are cut.

In order to properly cut the birds, the birds must be properly oriented at the beginning of the cutting line. In some instances, the shackles will not be properly oriented because the last step in the prior run has the shackles improperly oriented, or it is convenient to have the shackles turned sideways for hanging the birds on the shackles but the first cutting step might require the birds to be facing forwardly or rearwardly instead of to the side. Also, it is not unusual to have a few of the oncoming poultry shackles improperly oriented because of some activity up the line of the conveyor system.

If the birds are improperly oriented as they start through the cut-up line, the cutting processes will not be properly performed, and it is highly likely that the birds will be damaged because of the wrong orientation of the birds moving into a cut-up station.

This invention is directed to an improved, durable and accurate self realigning rotary shackle that reliably orients the shackle and the bird carried by the shackle to the proper orientation to start through the next processing station of a poultry processing line.

SUMMARY OF THE INVENTION

Briefly described, the present invention comprises a self realigning rotary shackle for transporting poultry carcasses along a poultry processing line that reorients the shackles that are not already properly aligned in the processing line so that the shackle, together with any bird carried by the shackle, is properly oriented for the next processing station. The shackle assembly includes a turning block that engages turning pins at the entry of the various processing stations. The turning block is approximately square and includes turning slots at its corners that engage and "walk around" turning pins that are positioned along the path of the turning block. Upon engaging a turning pin, the turning block will rotate 90°. The turning block can be rotated 180° upon engagement of two consecutive turning pins. The turning block can be rotated in either direction by engaging turning pins on opposite sides of its processing path.

The turning block includes opposed side edges or "wings" that are positioned radially from the axis of rotation of the turning block. One of the side wings includes a relief in its lower edge portion that intersects the adjacent turning slots. The relief extends high enough into the turning block so that the edge portion of the turning block above the relief fails to engage the turning pins. With this arrangement, the turning block and therefore the stirrup of the shackle assembly will be engaged by the turning slots so as to rotate the stirrup to the proper orientation, but when the stirrup is properly oriented, the relief of the turning block will be in its position to pass over the next turning pin(s), thereby leaving the turning block and the stirrups unturned. Usually, there will be three turning pins in a row so that no matter what orientation the stirrups are in as the shackle approaches the turning pins, the shackle will be rotated up to three times until the relief passes over any subsequent turning pins so as to achieve proper orientation of the stirrups.

In the disclosed embodiment, the turning block is telescopically and releasably mounted to a conveyor connector that always extends in alignment with the conveyor line. When the turning block is to be rotated by engagement with turning pins, the turning block is lifted against the bias of a spring away from the conveyor connector so as to become unlocked from the conveyor connector. The turning block is then free to rotate in response to engagement by the turning pins so as to effect the rotary movement of the stirrup of the shackle assembly. When the turning has been achieved, the turning block is released and the spring urges the turning block and conveyor connector back into engagement with each other so that they become locked together once again.

Another feature of the invention is at least one beam interrupter is fixedly mounted to and movable in unison with the shackle, so that the orientation of the shackle stirrups can be ascertained as the shackle assembly moves by a detector. This feature of the invention is used to shut down the conveyor line in the event that one or more of the shackles has become disoriented, so as to avoid movement of birds through the processing stations in wrong orientation.

Thus, it is an object of this invention to provide and improve shackle assembly for transporting poultry carcasses along a poultry processing line, so that the stirrups of the shackles will be properly oriented as the birds carried by the shackles are advanced to a cutting station.

Another object of this invention is to provide an improved shackle assembly for transporting poultry carcasses, wherein a turning block is configured to engage and turn about turning pins until a modified wing portion of the turning block is moved about the turning pins without turning the shackle, thereby assuring that the stirrups of the shackle are properly oriented for advancement of its bird into a cutting station.

Another object of this invention is to provide an improved method of orienting birds carried on a poultry processing line for proper cutting or other processing steps at the processing stations at positions along the processing line.

Other objects, features and advantages of the present invention will become apparent upon reading the following specification, when taken in conjunction with the accompanying drawings.

DETAILED DESCRIPTION

Figure 1:
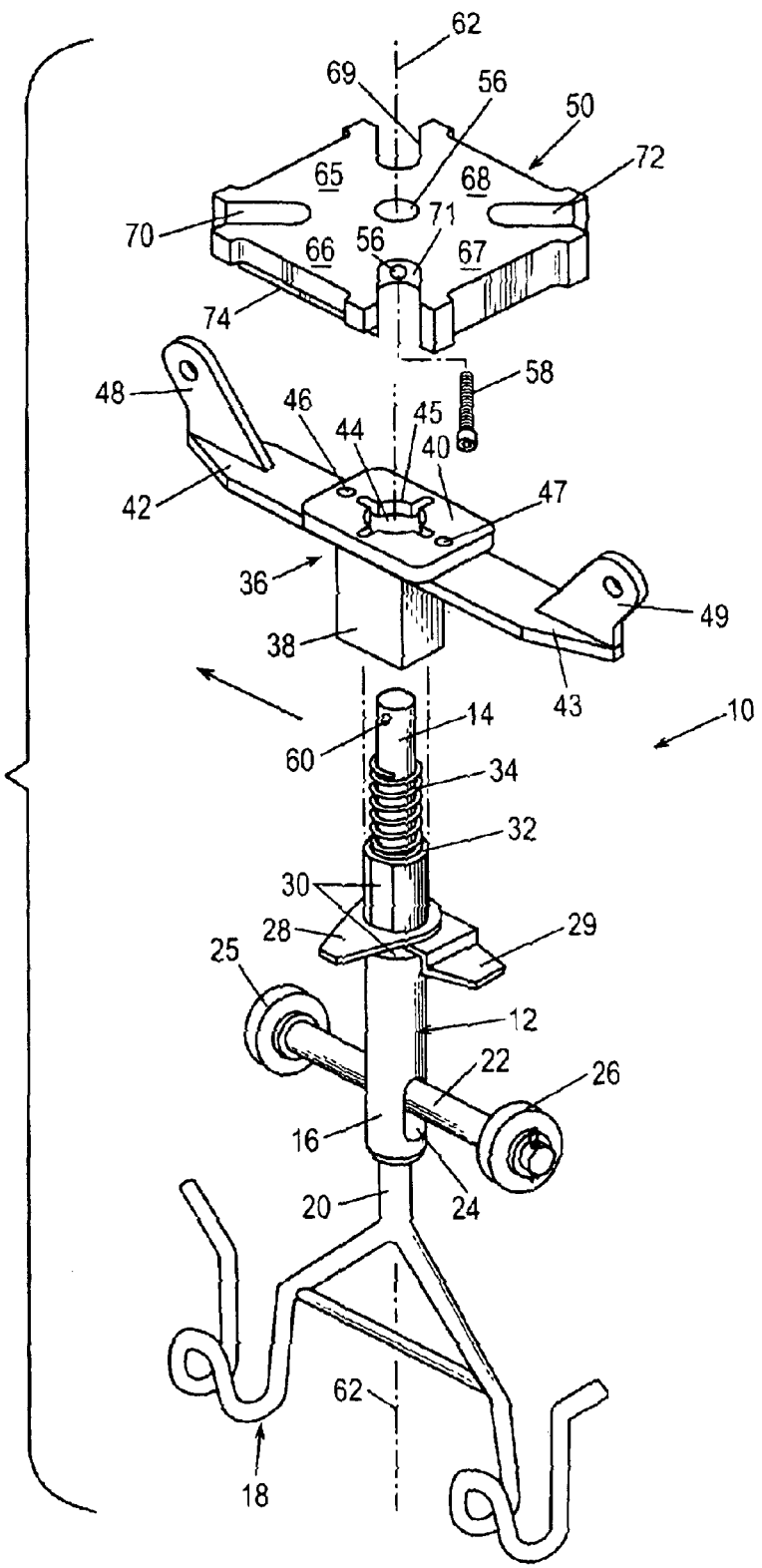
FIG. 1 is an expanded perspective illustration of the shackle assembly for transporting poultry carcasses along a poultry processing line.

Referring now in more detail to the drawings, in which like numerals indicate like parts throughout the several views, FIG. 1 illustrates a shackle assembly 10 of the type that is moved together with other shackles in series along a suspended poultry processing line 11 for the purpose of carrying poultry carcasses to cut-up stations, etc. The shackle assembly includes an elongated vertically oriented support rod 12 having a first or upper end 14 for upright suspension from a suspended conveyor line, and a second or lower end 16 for suspension below the upper end. Stirrups 18 have their stem 20 telescopically received in a tubular lower end 16 of the support rod 12. Axle 22 extends through elongated slots 24 of the lower end 16 of the support rod 12, and through an opening (not shown) in the stem 20 of the stirrups 18, and wheels 25 and 26 are mounted to the ends of the axle. The axle thereby loosely connects the stirrups 18 to the support rod 12, and the wheels of the axle can be passed over a scale for the purpose of weighing the bird carried by the stirrups 18.

One or more beam interrupter fins 28, 29 are rigidly mounted to the support rod 12 and are oriented at predetermined angles with respect to the support rod and stirrup 18. Detectors (not shown), such as proximity detectors, can be used to determine the presence or absence of the beam interrupter fins, thereby accurately determining the orientation of the stirrups 18. It will be noted that the fins 28 and 29 are configured differently so as to provide different signals to the detector means. While two fins 28 are illustrated, one or more fins can be utilized as may be desired for the particular system.

Collar 30 surrounds support rod 12 and fins 28 and 29 are mounted to the collar by a non-circular opening in each fin surrounding a non-circular portion of the collar, thereby assuring the proper orientation of each fin.

The upper end portion 14 of the support rod 12 is of reduced diameter, leaving an annular spring abutment shoulder 32, and coil compression spring 34 is telescopically mounted about the reduced diameter upper portion of the support rod 12 and rests on the annular spring abutment shoulder. Shackle assembly 10 also includes a conveyor connector assembly 36 that is connected to trolleys 37 of the conveyor of the poultry processing line 11. The conveyor connector assembly includes mounting tube 38, link connector block 40, and opposed links 42 and 43. The mounting tube 38 is telescopically received about the reduced diameter upper end 14 of the support rod 12, against the bias of spring 34. An opening 44 extends vertically through mounting tube 38 and link connector block 40. The opening 44 is enlarged at the upper surface of the link connector block 40 into a symmetrical, non-circular configuration having protrusions at each 90° thereabout. This forms a non-circular symmetrical cavity 45 that intersects the upper surface of the link connector block 40.

Figure 5:
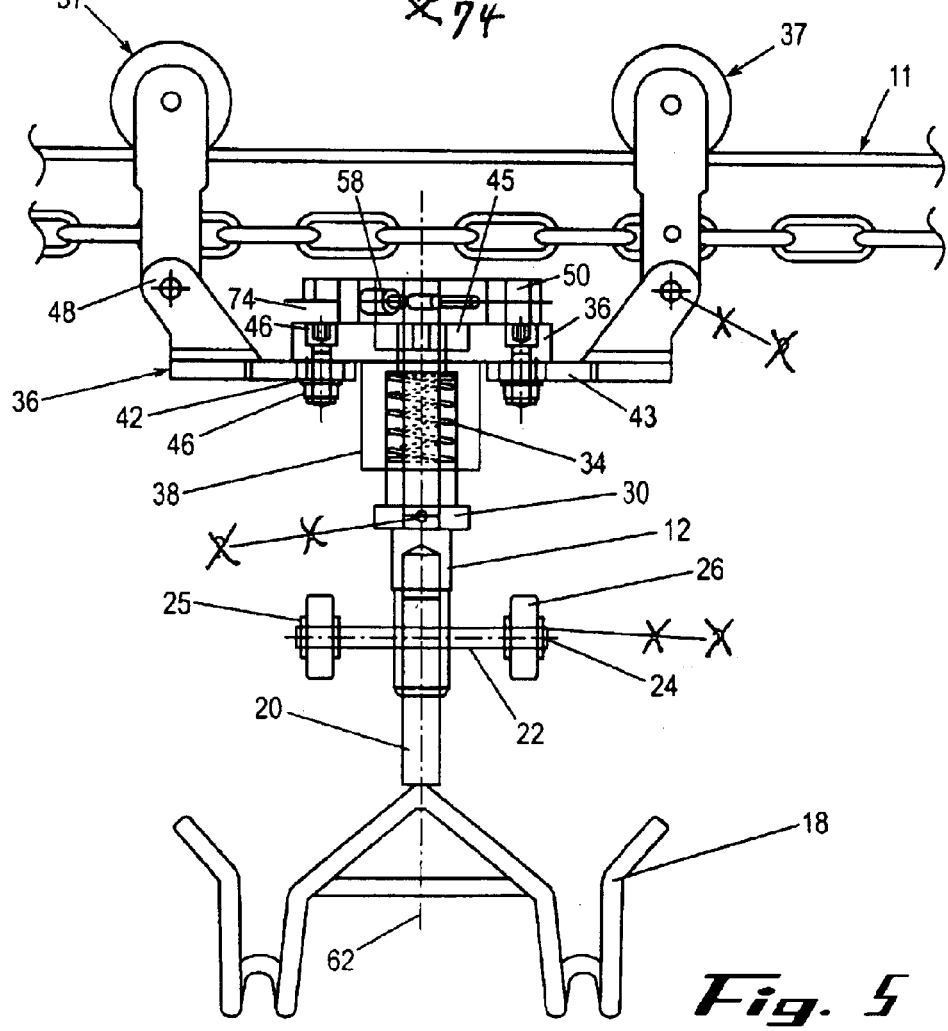
FIG. 5 is a side view of the shackle assembly, with portions shown in cross section.

The opposed links 42 and 43 are pivotally connected to the link connector block 40 by pivot pins 46 and 47, and link protrusions 48 and 49 extend upwardly from the opposed links 42 and 43 that are compatible with the conveyor system (FIG. 5) of the processing line. The conveyor system pulls the link protrusions, which causes horizontal movement of the shackle assembly 10 through the processing line.

Turning block 50 is mounted to the upper, reduced diameter end portion 14 of the support rod 12. A locking tube 52 extends downwardly from the lower surface of the turning block 50 and locking lobes 54 extend radially outwardly from the locking tube 52 at 90° intervals thereabout. The reduced diameter upper end portion 14 of the support rod 12 extends upwardly through the locking tube 52 and upwardly through the turning block 50. As shown in FIG. 1, the turning block 50 includes a centrally located opening 56 for receiving the upper end portion 14 of support rod 12.

The locking tube 52 and locking lobes 54 that protrude downwardly from the turning block 50 are compatible in shape with the non-circular, symmetrical cavity 45 of the link connector block 40. With this arrangement, the mounting block can be oriented at various 90° intervals of rotation with respect to the link connector block 40 and the conveyor connector assembly 36. In the meantime, turning block 50 is rigidly connected to support rod 12 by means of a connector screw 58 intersecting the turning block 50 and extending through the upper opening 60 formed in the upper end portion 14 of the support rod 12. With this arrangement, the turning block 50 and the stirrups 18 will move in unison about a central axis 62.

Turning block 50 is substantially of square configuration, having opposed side wings 65, 66, 67 and 68, with the wings being intersected by turning slots 69, 70, 71 and 72. The side wings extend radially from the central axis 62, as do the turning slots 69–72.

Figure 2:
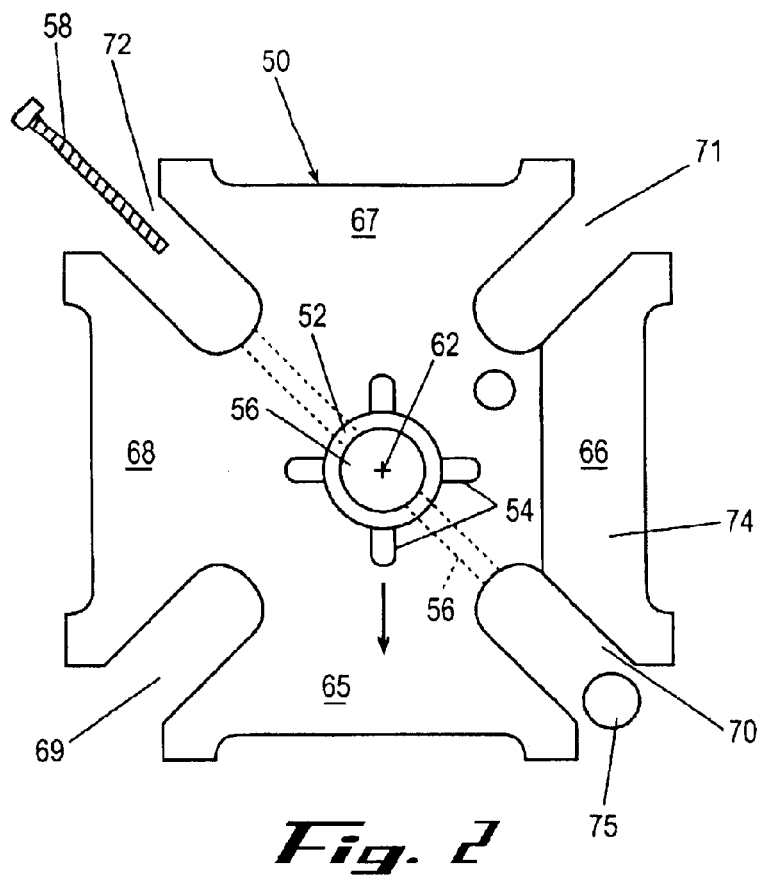
FIG. 2 is a side elevational view of the turning block of the shackle assembly, showing the relief of the turning block facing out from the drawing.

In the embodiment illustrated, the side wings 65, 67 and 68 are of equal depth, whereas side wing 66 has a lower relief 74. The relief 74 is formed by the side wing 66 being undercut, so that the side wing has its lower face undercut. In the meantime, the other side wings 65, 67 and 68 are not undercut but are of full, predetermined widths for engagement with turning pins, such as turning pin 75 of FIGS. 2–4.

Figure 3:
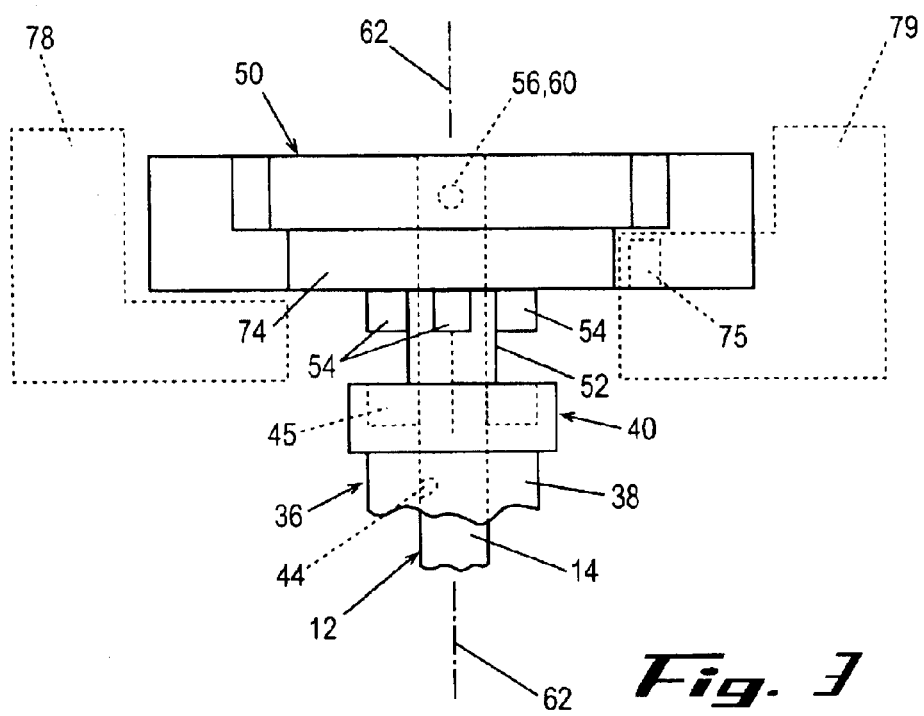
FIG. 3 is a side view of the turning block of FIG. 2, with the lifting cam shown in dashed lines.
Figure 4:
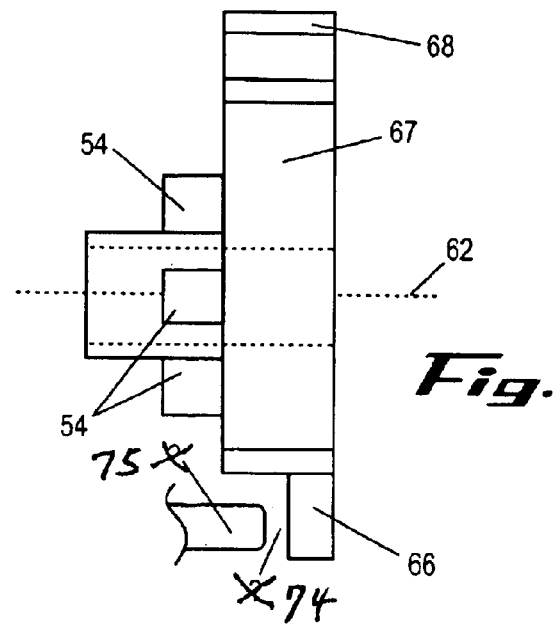
FIG. 4 is a side view of the turning block, similar to FIG. 3, but showing the relief of the turning block as it passes about a turning pin.

As shown in FIG. 3, the turning block 50 is lifted by cam tracks 78 and 79 (shown in dashed lines), so as to lift the locking lobes 54 of the turning block 50 away from the conveyor connector assembly 36, thereby releasing the locking lobes 54 from the non-circular symmetrical cavity 45 of the link connector block 40, allowing the turning block 50 and the support rod 12 of shackle assembly to rotate about the central axis 62 while the link connector block 40 remains aligned with the conveyor system. This allows the stirrups 18 to be reoriented in accordance with the rotation of the turning block 50. One of the turning slots 69–72 will engage a turning pin, such as turning pin 75, and the turning block will "walk around" the turning pin, thereby causing rotary motion of the turning block around its central axis 62. If the turning pin is long enough, all of the turning slots 69–72, including turning slot 71, will walk around the turning pin. However, if the turning pin is short and can protrude only into the relief 74 (FIG. 4) of the side wing 66, the turning block will not be affected by the short turning pin. However, the same short turning pin is still effective to engage the other turning slots, so as to rotate the turning block and the stirrups 18.

The effect of the combination of the relieved side wings 66, of being able to pass over a short turning pin, is such that if the stirrups are improperly oriented for the next cutting station, and if three short turning pins 75 are positioned along one side of the processing path, the turning block will rotate in response to the three short turning pins 75 engaging up to three of the turning slots until the relief 74 is moved adjacent the next oncoming short turning pin 75, whereupon no farther rotary movement will be effected. This assures that the stirrups 18 will be properly oriented for the next cutting station, so as to properly present the bird to the cutting blades of the cutting station.

In the event that the above noted procedure for properly orienting the stirrups is somehow avoided and a stirrup is improperly oriented as it approaches a cutting station, a detector, such as a proximity switch, will detect one of the fins 28 or 29, indicating that the stirrups are not properly oriented. The detector switch can be used to shut down the conveyor line so as to avoid the presentation of a bird in the wrong attitude to the next cutting station.

Although a preferred embodiment of the invention has been disclosed in detail herein, it will be obvious to those skilled in the art that variations and modifications of the disclosed embodiment can be made without departing from the spirit and scope of the invention as set forth in the following claims.

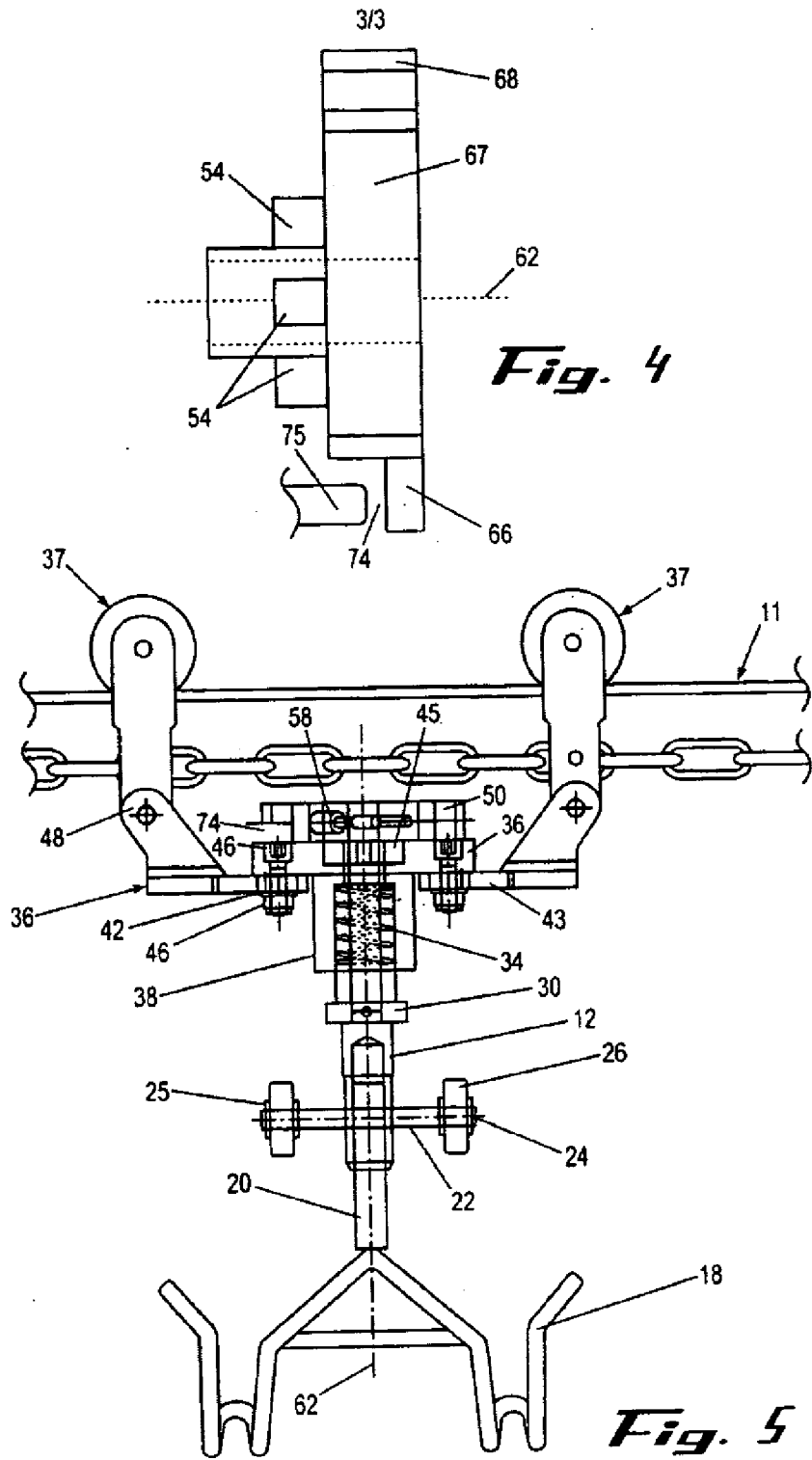

What is claimed is:

1. A shackle assembly for transporting poultry carcasses along a poultry processing line, comprising:

a shackle having a support rod with a first end for upright suspension from a suspended conveyor line and a second end for suspension below said first end, said second end including stirrups mounted thereto configured for supporting the legs of a poultry carcass, a turning block having a body defining a central axis and side wings extending normal to said central axis, said turning block non-rotatably mounted at its central axis to said second end of said support rod, with said side wings extending radially from said support rod, said turning block defining turning slots positioned between each said side wing, so that as said turning block advances toward a turning pin of a predetermined size positioned alone the processing line a turning slot receives the turning pin and the turning block steps around the turning pin to turn the turning block and said stirrups about said central axis, at least one of said side wings of said turning block being of a smaller thickness than the others of said side wings so that said smaller thickness side wing can pass about a short turning pin positioned along the processing line that is shorter than the other turning pins without turning the turning block and shackle.

2. The shackle of claim 1, wherein said smaller thickness side wing is configured to be turned by said turning pins of predetermined size.

3. The shackle of claim 1, wherein said shackle assembly includes a conveyor connector for connection to a continuous suspended conveyor line, and wherein said turning block and said conveyor connector define inter connecting shapes that lock said stirrups with respect to said conveyor connector at predetermined angles about said central axis.

4. The shackle of claim 3, and further including a spring extending about said support rod and arranged to bias said conveyor connector toward said turning block in locked relationship with said turning block.

5. The shackle of claim 1, and further including beam interrupter fins mounted on said shackle and extending away from said shackle for detection by a sensing device to determine the orientation of said stirrups.

6. The shackle of claim 1, wherein said stirrups are telescopically movable with respect to said support rod, and wheels mounted to said stirrups for lifting said stirrups and a poultry carcass carried by said stirrups for weighing the poultry carcass.

7. The shackle of claim 1, wherein said turning block is approximately square with said side wings having opposed edges oriented at 90° degrees from one another, and said turning slots intersecting said side wings.

8. A method of reorienting a poultry carcass carried by a shackle assembly having stirrups for supporting the legs of the poultry carcass to a predetermined orientation as the shackle assembly advances along a poultry processing line wherein said shackle assembly includes a turning block non-rotatably affixed to the stirrups and with the turning block including a central axis and thick and thin turning wings radiating from said central axis, comprising:

advancing the turning wings of the turning block toward a series of tall and short turning pins positioned along the processing line, engaging all of the thick and thin turning wings of the turning block against the tall turning pins, and in response to the engagement turning the turning block about the tall turning pins and reorienting the stirrups and the poultry carcass, and avoiding engagement of at least one of the thin turning wings of the turning block against the short turning pins and thereby avoiding turning the turning block as the turning block moves adjacent the short turning pins to leave the shackle assembly and the poultry carcass in the predetermined orientation.

* * * * *

UNITED STATES PATENT AND TRADEMARK OFFICE
CERTIFICATE OF CORRECTION

PATENT NO.    : 6,764,393 B1
DATED         : July 20, 2004
INVENTOR(S)   : Jacobus E. Hazenbroek and Jaco Gardenier It is certified that error appears in the above-identified patent and that said Letters Patent is hereby corrected as shown below:

Delete Drawing Sheet 3 of 3, and substitute Drawing Sheet 3 of 3 as shown on the attached sheet.

Signed and Sealed this

Twenty-third Day of November, 2004

JON W. DUDAS
*Director of the United States Patent and Trademark Office*